UNITED STATES PATENT OFFICE.

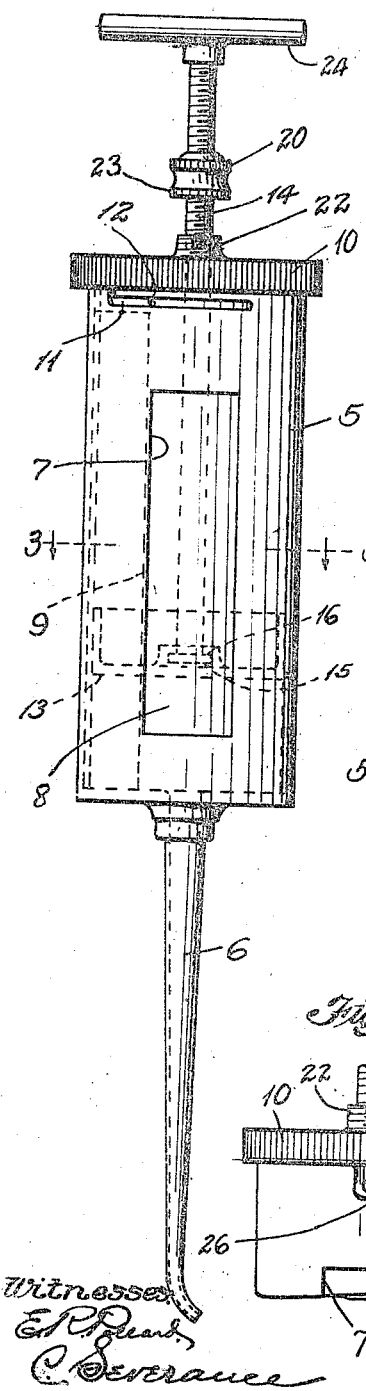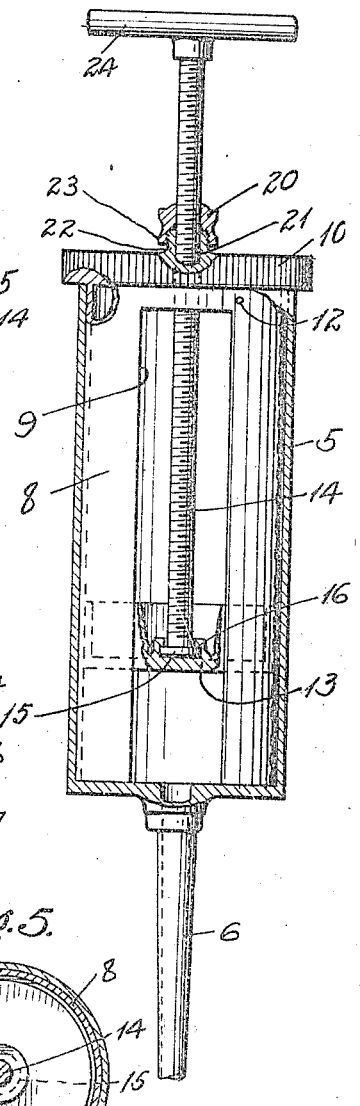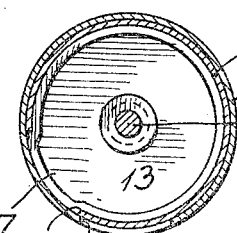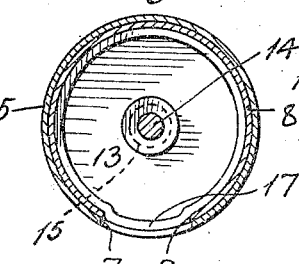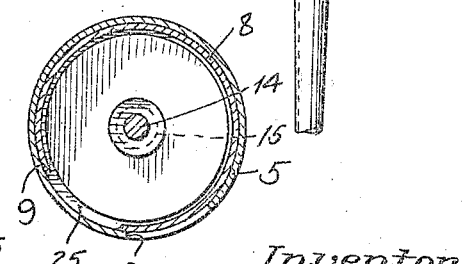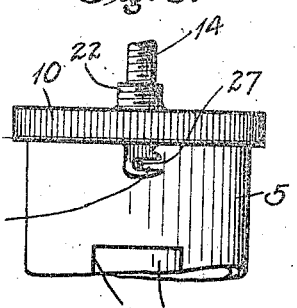

JONATHAN E. PETTIT, OF LOS ANGELES, CALIFORNIA, ASSIGNOR OF ONE-HALF TO EDMUND A. STRAUSE, OF LOS ANGELES, CALIFORNIA.

LUBRICANT-INJECTOR.

1,232,076.  Specification of Letters Patent.  Patented July 3, 1917.

Application filed February 7, 1912. Serial No. 675,962.

*To all whom it may concern:*

Be it known that I, JONATHAN E. PETTIT, a citizen of the United States, residing at Los Angeles, in the county of Los Angeles and State of California, have invented new and useful Improvements in Lubricant-Injectors, of which the following is a specification.

This invention relates to improvements in lubricating devices and particularly to lubricant injectors, and it is an object of the invention to provide a lubricating device which may be quickly charged with the lubricating material and which may then be operated to force the lubricant upon parts to be lubricated.

It is also an object of the invention to provide a lubricant injector having an elongated opening in the sides thereof, through which lubricant may be readily forced into the device after which the opening is closed and the parts brought to proper position for forcing the same into machinery to be lubricated.

In the accompanying drawing forming a part of this specification,

Figure 1 is a side elevation of the lubricant injector constructed in accordance with the present invention.

Fig. 2 is a longitudinal sectional view through the outer casing of the injector, the inner casing thereof being shown in elevation.

Fig. 3 is a transverse sectional view through the barrel of the injector, taken upon the line 3—3 of Fig. 1.

Fig. 4 is a similar transverse sectional view but showing the casing open for receiving the lubricant with which it is to be charged.

Fig. 5 is a similar transverse sectional view but showing a piston having a flexible or yielding packing provided thereon.

Fig. 6 is a detail view in side elevation of the head end of the injector showing the modified form of the detachable securing means employed for holding the head in place.

The details and features of the invention will now be more particularly described, reference being had to the said drawing in which 5 indicates a barrel and 6 a discharge spout leading from one end thereof and adapted to deliver lubricants forced by the device to any suitable machinery or parts of mechanism. The said barrel is preferably cylindrical and is provided with an elongated opening 7 in its side wall, the said opening extending for the greater portion of the length of said barrel. Within the barrel 5 is an inner casing 8 also cylindrical and made to fit snugly within the barrel 5, the said inner casing is provided with an elongated slot 9 in one side which is adapted to be brought by the turning of the inner casing, into coincidence with the opening 7. In this position lubricant can be quickly and readily placed within the device through the said coinciding openings. By turning the inner casing 8 so as to move the slot 9 out of register with the opening 7, the said opening will be closed and the escape of materials from within the device be prevented, except through the discharge spout 6.

The said inner casing 8 is provided with a head 10 by which the inner casing may be moved, the said head being adapted to rest against and overhang the edge of the open end of the barrel 5. The outer peripheral edge of said head 10 is also roughened or milled to facilitate the turning of the same.

In order to lock the inner casing with respect to the barrel 5 so as to prevent its being moved longitudinally with respect thereto, the said barrel is provided with an L shaped slot of the bayonet joint type which is adapted to receive a retaining pin or detent 12 carried by the said inner casing, as will be clearly understood by reference to Fig. 1. This connection between the parts permits of the separation of the same when necessary, but normally locks them together although permitting of the turning of the inner casing to close the opening 7.

The mechanism is provided with means for forcing the lubricant from the barrel, consisting preferably in a piston 13, connected with and operated by a piston rod 14. The end of the said piston rod has a swivel engagement with the piston, being provided with an enlarged head 15 adapted to movably engage a recess 16 formed upon the piston. The side walls of the piston which engage the inner casing are preferably made of sufficient width to prevent the piston from binding in its action within the said casing. The said piston is preferably made of metal, the peripheral wall thereof being usually formed with an off set portion 17 adapted to fit in the slot 9 formed in the inner casings as clearly shown in Figs. 3 and 4. In this way the grease or lubricant placed within the injector cannot squeeze by the piston.

The piston rod 14 is preferably screw threaded and adapted to engage internal threads formed in a collar 20 which is placed upon the said rod. The rod also passes through a smooth bearing 21 formed in the head 10, the head being provided with an exteriorly threaded flange 22 which projects beyond the surface thereof sufficiently to engage an internally threaded flange 23 formed upon the collar 20. The outer end of the rod 14 is also provided with an operating handle or head 24 of any desired construction whereby the said piston rod may be reciprocated or rotated.

When it is desired to force the grease from the injector by straight reciprocation of the rod 14, the collar 20 is moved outwardly upon the rod upon the threads thereof to a point where it will not be engaged by the flange 22. The operator by grasping the handle 24 may then reciprocate the rod and cause the piston to force lubricants from the injector casing through the discharge pipe 6. In using solid lubricants it is frequently desirable however to employ a screw acting means for forcing the lubricant out. In such case the collar 20 is screwed downwardly upon the threaded flange 22 and then by turning the handle 24, the rod 14 may be turned, so that its threads which engage the cap 20, will gradually force the piston inwardly.

While the piston may be made of metal as above described, it will also be understood that the said piston may be constructed in other ways and may be provided with a gasket or packing washer as 25 of a yielding material as for instance, leather, felt or the like, as shown in Fig. 5. In such instance the yielding character of the packing will cause the washer to fill the space at the slot 9 to prevent the passage of grease by the piston.

As shown in Fig. 6 a slightly different type of lock for the inner casing may also be employed, a hook 26 being formed upon the head 10 and arranged to project inwardly upon the surface of the barrel 5. A detent or pin 27 secured to said barrel and projecting therefrom will afford a means in coöperation with the said hook for locking the parts together. With this latter form of lock the inner casing may be turned, after the pump has been loaded with lubricants, to a position diametrically opposite to the opening 7, so that heavy oils or liquid lubricants that may be placed in the injector will not escape between the barrel and the inner casing.

The operation of the mechanism is obvious from the above description.

What I claim is:

1. A lubricator comprising a cylinder having an opening formed in the side thereof, a rotating closure for said opening, and means for expelling the contents of said cylinder after said opening has been closed.

2. A lubricator comprising a cylinder having an opening formed in the side thereof, a sleeve mounted upon said cylinder and provided with a side opening adapted to be brought into and out of registry with the opening formed in said cylinder, and means for expelling the contents of said cylinder after said openings have been moved out of alinement.

3. A grease gun comprising an outer casing provided with a slot in its side wall, an inner casing having a slot in its side wall, a plunger mounted in the inner casing, a transverse slot in the outer casing, a pin connected to the inner casing through said slot to limit the movement of the casings relatively to bring the slots in the side walls into coincidence, and to limit the closing movement of said casings one relatively to the other.

4. A lubricant injector, comprising a barrel having a longitudinally extending elongated opening in its side wall and having a discharge spout at one end thereof, an inner casing having an elongated opening corresponding with the opening in the barrel, a head capable of turning said casing to open or close the opening in the walls of the injector, a piston fitting within said inner casing, means for reciprocating the same, and means connecting the barrel and casing against longitudinal movement in relation to each other and for limiting the rotary movement of said inner casing.

5. A grease gun comprising an inner and an outer casing mounted to rotate one relatively to the other, and the outer casing being provided with a discharge nozzle, said inner and outer casings being provided with openings formed longitudinally thereof, means for limiting the rotative movement of said casings relatively, and a plunger mounted in the inner casing to force the contents out through the nozzle, when the longitudinal openings are closed.

6. A grease gun comprising an inner and an outer casing mounted to rotate one relatively to the other, and the outer casing being provided with a discharge nozzle, said inner and outer casings being provided with openings formed longitudinally thereof, and a plunger mounted in the inner casing to force the contents out through the nozzle, when the longitudinal openings are closed.

7. A lubricant injector, comprising a cylinder having an opening formed in the side thereof, a rotating closure for said opening, and a solid piston mounted in said cylinder to expel the contents when said opening has been closed.

In witness that I claim the foregoing I have hereunto subscribed my name this 3rd day of January, 1912.

JONATHAN E. PETTIT.

Witnesses:
CASSELL SEVERANCE,
E. R. POLLARD.